US009430477B2

(12) United States Patent
Ashour et al.

(10) Patent No.: US 9,430,477 B2
(45) Date of Patent: Aug. 30, 2016

(54) PREDICTING KNOWLEDGE GAPS OF MEDIA CONSUMERS (71) Applicant: International Business Machines Corporation, Armonk, NY (US)

(72) Inventors: Gal Ashour, Yoqneam (IL); Mattias Marder, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 14/274,778

(22) Filed: May 12, 2014

(65) Prior Publication Data

US 2015/0324429 A1    Nov. 12, 2015

(51) Int. Cl.
*G06F 17/00* (2006.01)
*G06N 5/02* (2006.01)
*G06F 17/30* (2006.01)
*G06N 5/04* (2006.01)

(52) U.S. Cl.
CPC ... *G06F 17/30029* (2013.01); *G06F 17/30528* (2013.01); *G06N 5/04* (2013.01)

(58) Field of Classification Search
CPC combination set(s) only.
See application file for complete search history.

(56) References Cited

U.S. PATENT DOCUMENTS

| | | | |
|---|---|---|---|
| 7,493,312 B2 | 2/2009 | Liu et al. | |
| 7,698,270 B2 * | 4/2010 | Brave | G06F 17/30867 707/603 |
| 7,702,643 B2 * | 4/2010 | Oara | G06F 17/30595 707/999.101 |
| 7,702,690 B2 * | 4/2010 | Brave | G06F 17/30867 707/776 |
| 7,826,714 B2 | 11/2010 | Berstis et al. | |
| 7,856,446 B2 * | 12/2010 | Brave | G06F 17/30867 707/776 |
| 8,108,413 B2 * | 1/2012 | Kar | G06F 17/30705 707/758 |
| 8,200,522 B2 * | 6/2012 | Bruce | G06F 8/61 705/301 |
| 8,209,660 B2 * | 6/2012 | Sundararajan | G06F 8/71 717/105 |
| 8,301,498 B1 | 10/2012 | Cortes et al. | |
| 8,341,659 B2 | 12/2012 | Yoon et al. | |
| 8,370,288 B2 | 2/2013 | Harris | |
| 8,549,629 B1 * | 10/2013 | McCreesh | G06F 21/316 726/22 |
| 8,601,023 B2 * | 12/2013 | Brave | G06F 17/30867 707/732 |
| 8,935,655 B2 * | 1/2015 | Channabasavaiah | G06Q 10/06 705/7.37 |
| 8,996,587 B2 * | 3/2015 | Kar | G06F 17/2705 704/9 |
| 9,009,653 B2 * | 4/2015 | Padmalata | G06Q 10/00 717/101 |
| 9,031,993 B2 * | 5/2015 | Bishop | G06F 17/30011 707/797 |

FOREIGN PATENT DOCUMENTS

WO    2004/098180    11/2004

OTHER PUBLICATIONS

Dominant user context (DUC) filtering framework for web personalized search Nazihah Abdul Kadir; Anitawati Mohd Lokman; Aishah Ahmad Wireless Technology and Applications (ISWTA), 2012 IEEE Symposium on Year: 2012 pp. 280-285, DOI: 10.1109/ISWTA.2012.6373862 IEEE Conference Publications.*

(Continued)

*Primary Examiner* — Michael B Holmes (57) ABSTRACT

A method comprising using at least one hardware processor for receiving a request of a user for media, retrieving a first metadata set relating to said media, comparing between: (a) a media usage profile of the user, which profile reflects knowledge of the user, and (b) the first metadata set relating to said media, to identify gaps in the knowledge of the user with respect to said media, and providing to the user information relating to said identified gaps.

20 Claims, 5 Drawing Sheets

(56) References Cited

OTHER PUBLICATIONS

The networked gatekeeping process for news in the 21st century Thomas Ernste Collaboration Technologies and Systems (CTS), 2014 International Conference on Year: 2014 pp. 11-18, DOI: 10.1109/CTS.2014.6867536 IEEE Conference Publications.*

Return on Investment in Social Media—Does the Hype Pay Off? Towards an Assessment of the Profitability of Social Media in Organizations Fabian Kaske; Maurice Kugler; Stefan Smolnik System Science (HICSS), 2012 45th Hawaii International Conference on Year: 2012 pp. 3898-3907, DOI: 10.1109/HICSS.2012.504 IEEE Conference Publications.*

Modeling Social Attention for Stock Analysis: An Influence Propagation Perspective Li Zhang; Keli Xiao; Qi Liu; Yefan Tao; Yuefan Deng Data Mining (ICDM), 2015 IEEE International Conference on Year: 2015 pp. 609-618, DOI: 10.1109/ICDM.2015.117 IEEE Conference Publications.*

Narameth Nananukul, "An Inference Model for Online Media Users", Journal of Data Science 11, pp. 143-155, 2013.

Lie et al., "Video Summarization Based on Semantic Feature Analysis and User Preference", SUTC '08—IEEE International Conference on Sensor Networks, Ubiquitous and Trustworthy Computing, 2008 , Jun. 11-13, 2008, pp. 486-491.

* cited by examiner

PREDICTING KNOWLEDGE GAPS OF MEDIA CONSUMERS

BACKGROUND

The present invention relates to the field of media services.

Media are the storage and transmission channels or tools used to store and deliver information or data and may refer to any means of information communication. Electronic media is enjoying broader use every day with an increase in electronic devices being manufactured.

Media services may provide consumers with access to media such as video and/or music. Some media services may provide further information with respect to the requested media, for example in the form of video annotations (e.g. differently-positioned text overlays), subtitles and information provided separately from the video content.

The term "metadata" means information with respect to data. The term may relate to two different concepts: structural metadata or descriptive metadata. Descriptive metadata is about individual instances of application data, the data content. Metadata are traditionally found in the card catalogs of libraries. As information has become increasingly digital, metadata are also used to describe digital data using metadata standards specific to a particular discipline. By describing the contents and context of data files, the quality of the original data/files is greatly increased. For example, a webpage may include metadata specifying what language it is written in, what tools were used to create it, and where to go for more on the subject, allowing browsers to automatically improve the experience of users. Metadata are very useful, for example, metadata in video may include information about its contents (such as transcripts of conversations and text descriptions of its scenes).

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method comprising using at least one hardware processor for: receiving a request of a user for media; retrieving a first metadata set relating to said media; comparing between (a) a media usage profile of the user, which profile reflects knowledge of the user, and (b) the first metadata set relating to said media, to identify gaps in the knowledge of the user with respect to said media; and providing to the user information relating to said identified gaps.

There is further provided, in accordance with an embodiment, a system comprising: at least one server, the at least one server comprising at least one hardware processor configured to: receive a request for media from a user; provide said request for media to a knowledge gap predictor, to receive information relating to gaps identified in knowledge of said user with respect to said media; retrieve said media from a media database; and provide to said user said media and said information.

There is yet further provided, in accordance with an embodiment, a computer program product comprising a non-transitory computer-readable storage medium having program code embodied therewith, the program code executable by at least one hardware processor to: receive a request of a user for media; retrieve a first metadata set relating to said media; compare between (a) a media usage profile of the user, which profile reflects knowledge of the user, and (b) the first metadata set relating to said media, to identify gaps in the knowledge of the user with respect to said media; and provide to the user information relating to said identified gaps.

In some embodiments, said providing to the user the information relating to the identified gaps comprises: generating a gap analysis report comprising a set of facts each representing a gap of said identified gaps, and generating gap summaries for said set of facts based on said gap analysis report and said first metadata set, wherein each of said gap summaries is generated for each fact of said set of facts.

In some embodiments, said providing to the user the information relating to the identified gaps further comprises retrieving a second metadata ser relating to said identified gaps and wherein said generating of gap summaries is based on said second metadata set.

In some embodiments, the method further comprises using said at least one hardware processor for generating said media usage profile of the user.

In some embodiments, the method further comprises using said at least one hardware processor for updating the media usage profile of the user with an identifier of said media and a metadata set relating to said request for media.

In some embodiments, said providing to the user of information relating to the identified gaps comprises providing to the user said media integrated with said information.

In some embodiments, the method further comprises using said at least one hardware processor for providing to said user said media.

In some embodiments, said media is selected from the group consisting of: a video, an image, audio, a text or a combination thereof.

In some embodiments, the at least one server further comprises said knowledge gap predictor, and wherein said knowledge gap predictor is configured to: retrieve a media usage profile of said user from a media usage profile database, said media usage profile reflecting said knowledge of said user; retrieve a first metadata set relating to said media from a media metadata database; and compare between said media usage profile of said user and said first metadata set relating to said media, to identify said gaps in knowledge of said user with respect to said media.

In some embodiments, the knowledge gap predictor is further configured to: generate a gap analysis report comprising a set of facts, wherein each fact of said set of facts represents a gap of said gaps identified in said knowledge of said user, and provide to a media gap summarizer said gap analysis report, to receive said information.

In some embodiments, the at least one server further comprises said media gap summarizer, and wherein said media gap summarizer is configured to generate said information based on said gap analysis report and said first metadata set.

In some embodiments, said generating of said information comprises generating gap summaries, wherein a gap summary of said gap summaries is generated for each fact of said set of facts.

In some embodiments, said at least one hardware processor is further configured to provide said request for media to a media usage monitor, to update said knowledge of said user in the context of said request for media.

In some embodiments, said at least one server further comprises said media usage monitor, wherein said media usage monitor is configured to: retrieve a metadata set relating to said media from a media metadata database, and update a media usage profile of said user with an identifier of said media and said metadata set in a media usage profiles database, wherein said media usage profile reflects said knowledge of said user.

In some embodiments, said program code is further executable by said at least one hardware processor to generate said media usage profile of the user.

In some embodiments, said program code is further executable by said at least one hardware processor to update the media usage profile of the user with an identifier of said media and a metadata set relating to said request for media.

In some embodiments, said program code is further executable by said at least one hardware processor to provide to said user said media.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Methods, systems and computer program products are disclosed herein, for predicting a user's knowledge gaps with respect to some content, and thus allowing a determination of whether information should or should not be shared with the user. User knowledge may be learned based on media consumption patterns. Using media metadata, knowledge gaps are discovered and information, such as summaries, helping users to compensate on gaps may be provided prior to, during and/or following media consumption.

The term "media", as referred to herein, may relate to electronic means of expression and/or communication, such as video files, audio files, image files and text files (will be accordingly referred herein below as "video", "audio", "image" and "text") or any combination thereof.

The term "metadata", as referred to herein, may relate to information with respect to the media.

The term "metadata set", as referred to herein, may relate to a collection of metadata items relating to a specific media.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
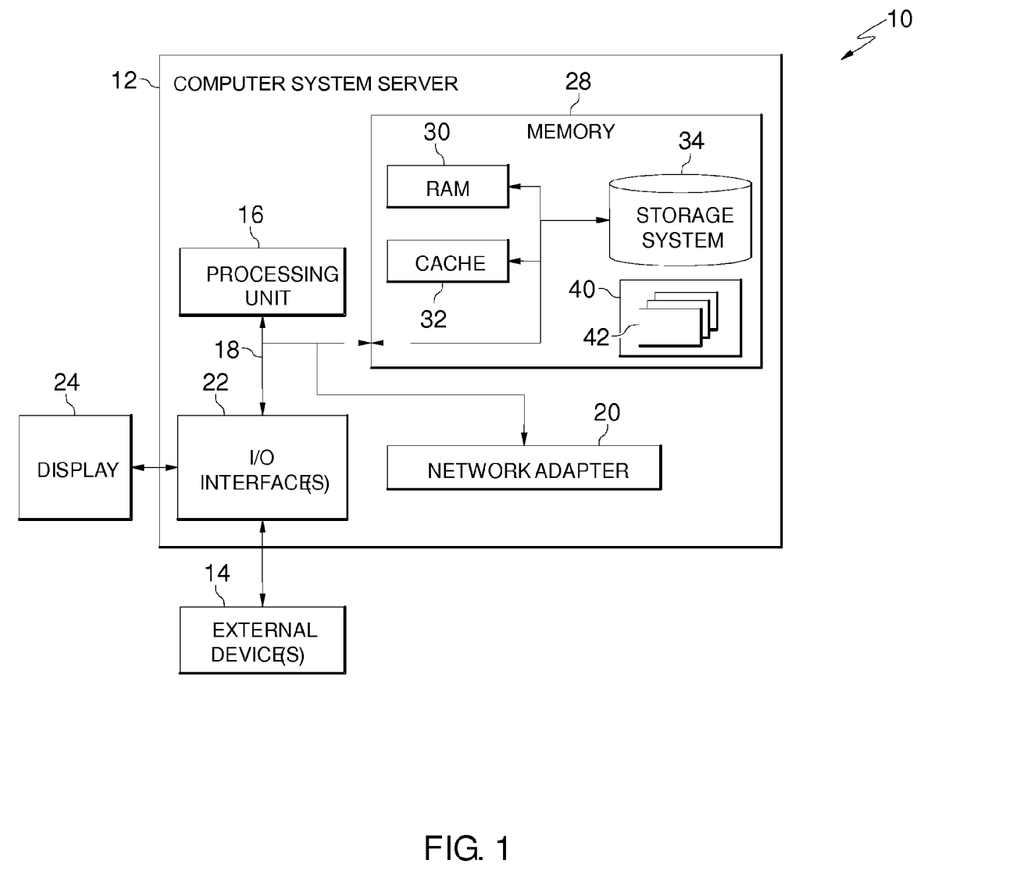
FIG. 1 shows a schematic illustration of an example of a cloud computing node.

Referring now to FIG. 1, a schematic illustration of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system.

Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
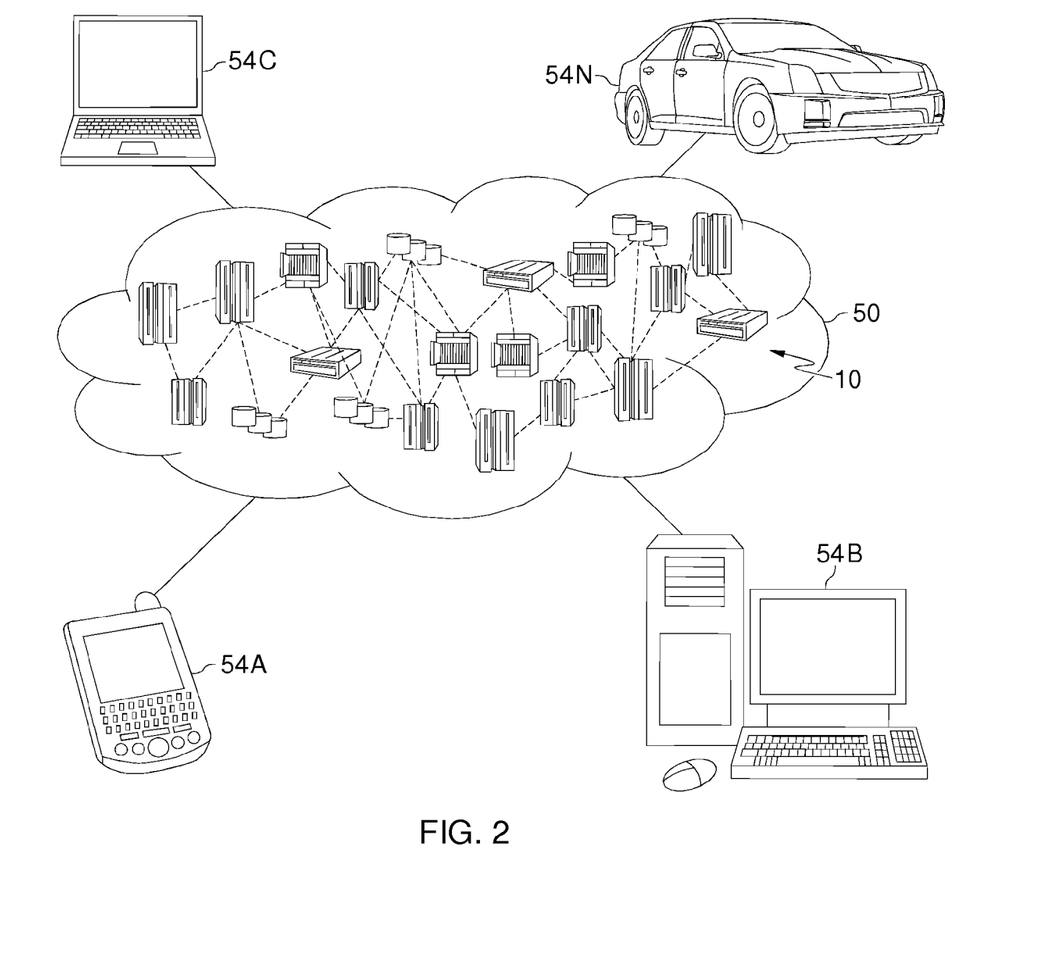
FIG. 2 shows an illustrative cloud computing environment.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
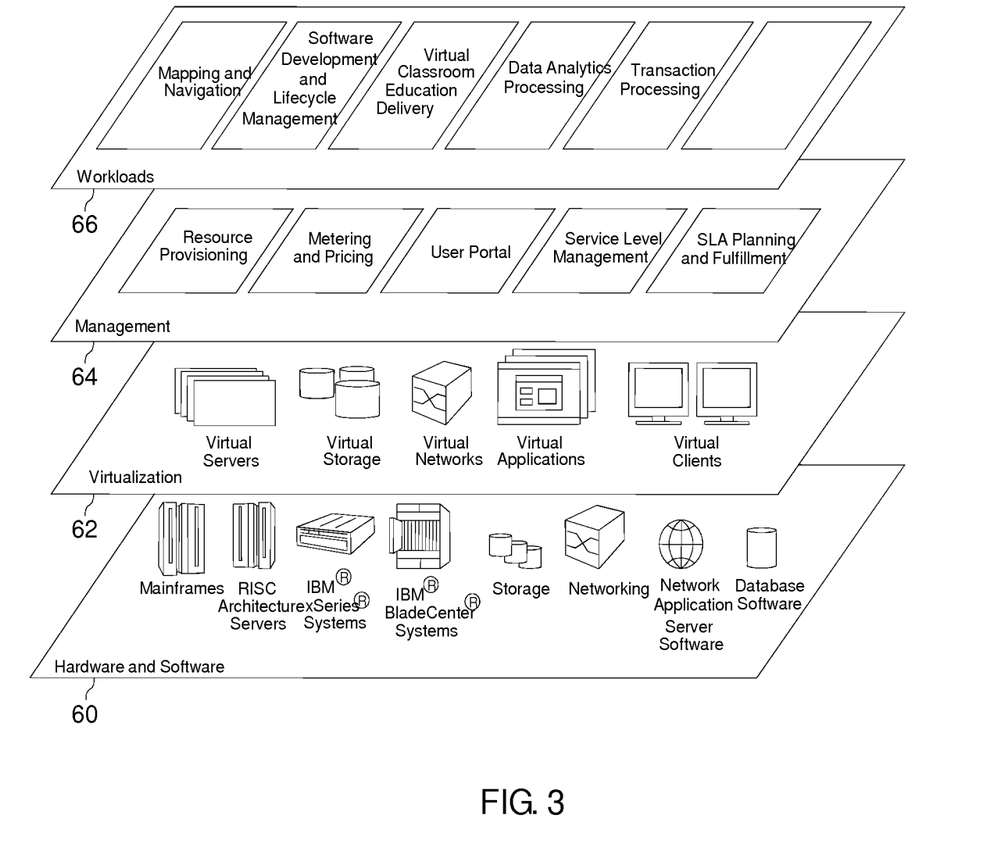
FIG. 3 shows a set of functional abstraction layers provided by the cloud computing environment.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing.

Figure 4:
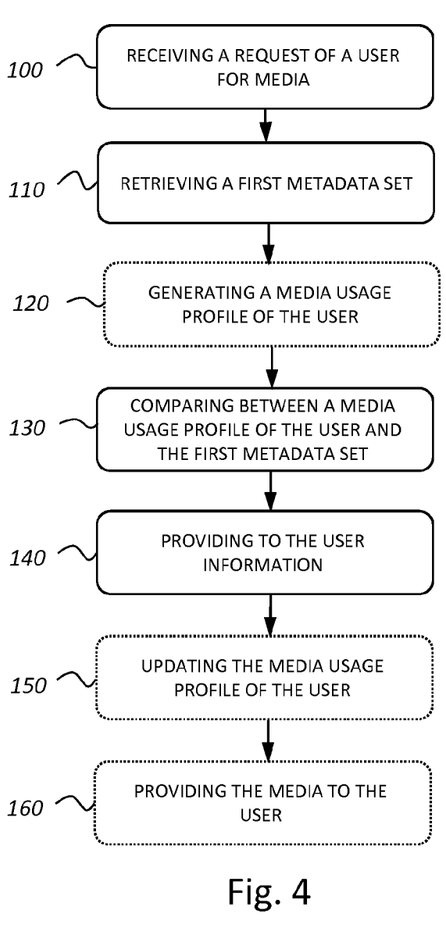
FIG. 4 shows a flowchart of a method, constructed and operative in accordance with an embodiment of the disclosed technique.

Reference is now made to FIG. 4 which shows a flowchart of a method, constructed and operative in accordance with an embodiment of the disclosed technique. In a step 100, a request of a user for media may be received. For example, such a request may be entered by a user to a computer serving as a media client. The media may include, for example, a video, an image, an audio and/or text.

In a step 110, a first metadata set relating to the media may be retrieved. The metadata may include information relating to the media. The information may be represented as facts. For example, if the media is a movie (i.e., video), then metadata relating to the video may include the movie title, genre, cast, director, special themes, anecdotes known for the movie, sequels, historic era in which the movie's plot occurs or the movie relates to, geographic locations at which the plot takes place etc. The metadata may be retrieved from a database including media metadata, such as www.imdb.com, Wikipedia or any other open source. The metadata may be retrieved from such open sources by using Application Program Interfaces (APIs), as known in the art.

In an optional step 120, a media usage profile of the user may be generated. A media usage profile of a user may document which media has been consumed by the user in the past and therefore reflects related knowledge of the user, i.e., related metadata about the consumed media. For example, such metadata may be metadata available in the media metadata database. The media usage profile of a user may include facts known to the user (i.e., knowledge of the user). The user knowledge may be represented as a set of facts by using formats such as resource description framework (RDF). A media usage profile may be generated for each user, for example, at the user's first request for media. Optionally, following a user's request for media, a check for the existence of a media usage profile for the specific user may be performed. If none is found, then a media usage profile for this user may be generated. The user's usage profile may be stored in a media usage profiles database. The user may be provided with the option to choose if information with respect to his media usage would be stored, therefore if such profile would be generated and/or updated. When a user profile is generated, it may be initially profiled similarly to users having similar characteristics (e.g., age, marital status etc.). The profile may be updated later on according to the media usage of the user.

In a step 130, a media usage profile of the user, which profile reflects knowledge of the user, may be compared with the first metadata set. The comparison may be performed by using linguistic tools such as Lucene and/or semantic similarity tools such as Jaccard, explicit semantic analysis (ESA) and/or Graph Edit Distance. Facts known to the user (i.e., included in the media usage profile of the user) may be compared with other facts known about the media (i.e., included in the first metadata). The aim of this comparison is to identify gaps in the knowledge of the user with respect to the requested media. Such gaps may be of various types. For example, for movies, the results of the comparison may reveal that the user has never seen a movie acted by a certain actor or directed by a certain director. As another example, using movie metadata about sequels, the comparison results may reveal that the user has no background knowledge about the movie which may be dependent on watching the previous movies, not yet watched by the user (e.g., The Fellowship of the Ring vs. The Two Towers of the Lord of the Rings series). A further example may relate to a book (i.e., media of a text type) written by a certain author. The comparison results may reveal that the user has no background knowledge of that author.

In a step 140, information relating to the identified gaps may be provided to the user. The information may be provided, for example, in the form of text, images and/or references, such as hyperlinks, to further information. Such references to further information may include references to Internet sites, books, movies, documents, institutions (e.g., museums and/or libraries) and/or hyperlinks to various types of media, such as texts, videos, audio files, images etc. Optionally, the information may be displayed to the user. The information may be provided to the user at the time of ordering or selecting of the media or after the selecting or ordering of the media is complete. Referring to the examples listed in the paragraphs above, in the first example, the information may include, for example, a list of movies acted by a certain actor playing at the requested movie or which have been directed by the director of the requested movie, background of the actor or director etc. In the second example, the information may list the previous movies and/or the following movies in the series with respect to the requested movie. The information may further include short summaries of these movies and/or links to these movies. In the third example, the information may include text and image information about the author, and/or list of further books which were written by the author, and/or references to information sources with respect to the author (e.g., a link to a relevant entry in Wikipedia), and/or list of related institutions (e.g., relevant museums).

Optionally, a gap analysis report may be generated. The gap analysis report may include a set of facts. Each fact of the set of facts may represent an identified gap of information. A second metadata set relating to the identified gaps (or facts) may be retrieved, for example, from the media metadata database. The information provided to the user may be derived from the second metadata set. Gap summaries may be generated for the set of facts based on the gap analysis report and the second metadata set. A gap summary may be generated for each fact of the set of facts. Each gap summary may include metadata from the second set of metadata relating to the corresponding fact). Alternatively, the first metadata set may be used. Referring to the examples listed in the paragraph above, in the first example, a fact may be the name of the actor that the user is probably not familiar with. A gap summary may be generated for this fact. The gap summary may include, for example, information about the actor's background, his role in the movie, his filmography (all in text format), hyperlinks to articles discussing the actor's life and/or career and an image of the actor.

In an optional step 150, the media usage profile of the user may be updated with an identifier of said media and a metadata set relating to said request for media. Each time a user makes a request for media, his media usage profile may be updated accordingly.

In addition, the media usage profile of the user may be updated with respect to media usage patterns of the user. Usage patterns may indicate, for example, special interests of the user and which type of information he desires (i.e., which knowledge gaps the user is interested to fill in). For example, if a user often or multiple times makes a request for movies directed by a certain director, then this may indicate that the user is interested in receiving information relating to this specific director. Usage patterns may include the manner of using the media. For example, a user may watch only specific portions of a video. Such usage pattern may indicate specific interests of the user or a gap that the user is interested to fill in (e.g., filling in some background before watching some other requested content). As another example, a user may watch a specific portion of content more frequently. Such pattern may indicate of a difficulty of the user with respect to this content portion, e.g., difficulty in understanding the content or of a particular interest to the user. Optionally, users may be profiled according to their usage patterns, such that users with similar usage patterns may be profiled in a similar manner. Thus, for example, a user having usage patterns similar to another user or other users, e.g., with respect to a certain type of media, may be considered as having a similar knowledge.

Optionally, metadata with respect to the media may be associated with various media segments (or episodes) correspondingly. Such associated metadata may be used to better estimate what facts the user may or may not know with respect to a media and therefore to generate a more accurate media usage profile for gap analysis. For example, media segments may be labeled according to their content. If a user consumes a segment, then his user profile may be updated according to the label of the consumed segment (e.g., adding the label to the user's knowledge).

The metadata set may be retrieved from the media metadata database or from an additional, separate such database. The metadata set may be the first and/or the second metadata set (i.e., retrieved from the media metadata database) or another, additional metadata set.

A media usage profile of a user may be maintained using description logic to document facts about the media that are known to the user based on implicit analysis of the user's media usage. For example, for a movie media, if the user sees a movie by a certain director or from a sequel, than this fact may be either documented for the first time in the user's media usage profile or may be used to update the user's media usage profile, strengthening the knowledge about the facts that the user is familiar with.

In an optional step 160, the media may be provided to the user. The information (e.g., gap summaries) may be provided to the user together with the media. The information may be provided to the user before playback of the media, e.g. before or at the time of ordering or selecting of the media, or before the playback of a certain segment of the media content. Optionally, the media may be integrated with the information. For example, the video may be interleaved with the information in the form of additional video frames, annotations, clickable uniform resource locators (URLs), hotlinks, pop up windows, sidebar windows and/or menus. For example, with respect to media having time duration (e.g., video and/or audio), the information may be integrated in the media in specific time points of the media correspondingly (i.e., integrating in a time point information corresponding to the content of the media at this time point). Optionally, the information may be provided to the user separately from the media. For example, the information may be displayed to the user or played before or after displaying or playing of the media. Alternatively, if feasible, the information and the media may be displayed to the user simultaneously or one of them may be played simultaneously to the displaying of the other.

Figure 5:
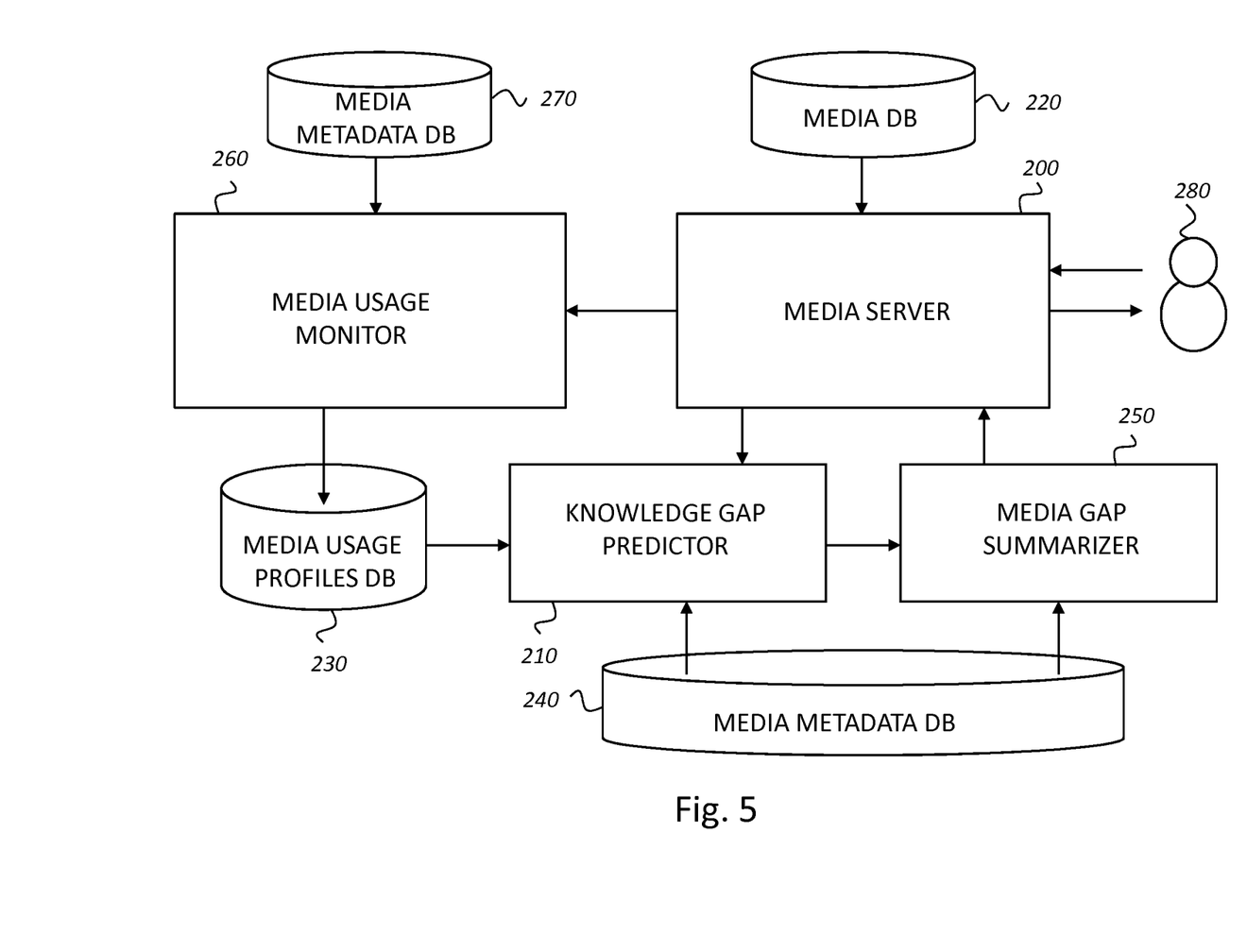
FIG. 5 shows a schematic illustration of an exemplary architecture of a system according to an embodiment.

Reference is now made to FIG. 5, which shows a schematic illustration of an exemplary architecture of a system according to an embodiment. The system (not indicated) may include a media server 200 (will be also referred herein below as "server 200"). Server 200 may include one or more hardware processors (not shown). The operation described herein below as performed by server 200 may be performed by the one or more hardware processors of server 200 unless indicated otherwise. Server 200 may further include one or more storage mediums (not shown). The storage mediums may be non-transitory computer-readable storage mediums.

In some embodiments, the system may include multiple servers, at least some of them similar to server 200. In such a multi-server configuration, the operations performed by server 200, as described herein, may be distributed between several servers.

In some embodiments, the system may operate in accordance with the method of FIG. 1. The method of FIG. 1 may be executed by the one or more hardware processors of server 200 or of multiple servers in a multiple server configuration of the system.

Server 200 may receive a request for media from a user 280, for example, through a personal computer of user 280 which serves as a media client. Server 200 may provide the request for media to a knowledge gap predictor 210 in order to receive information relating to gaps identified in knowledge of user 280, with respect to the requested media. Server 200 may retrieve the media from a media database 220, and provide to user 280 the media and the related received information. Knowledge gap predictor 210 may be embodied as a software module aimed to receive a media request as input. Knowledge gap predictor 210 may be installed on a computer other than server 200, which may be coupled with server 200, e.g., via the internet. Alternatively, the media server and the media client may be in the same computer, e.g., in the form of a dedicated software application (e.g., a media player).

In some embodiments, server 200 may include knowledge gap predictor 210. Knowledge gap predictor 210 may be installed on a storage medium of server 200. Knowledge gap predictor 210 may retrieve a media usage profile of user 280, the media usage profile being as described with respect to the method of FIG. 4. Knowledge gap predictor 210 may retrieve the media usage profile of user 280 from a media usage profile database 230. The media usage profile of user 280 may reflect knowledge of user 280. Knowledge gap predictor 210 may retrieve a first metadata set relating to the requested media from a media metadata database 240. Knowledge gap predictor 210 may then compare between the media usage profile of user 280 and the first metadata set in order to identify gaps in the knowledge of user 280 with respect to the requested media. Media usage profile database 230 may be stored in a remote computer which may be coupled with server 200. Media metadata database 240 may be stored in a remote computer, which may be coupled with server 200.

In some embodiments, knowledge gap predictor 210 may be further configured to generate a gap analysis report, as described with respect to the method of FIG. 4. Knowledge gap predictor 210 may provide the gap analysis report to a media gap summarizer 250. Media gap summarizer 250 may provide the information relating to the identified knowledge gaps of user 280 to server 200. Media gap summarizer 250 may be embodied as a software module which may be installed on a remote computer coupled with server 200.

In some embodiments, server 200 may include media gap summarizer 250. Media gap summarizer 250 may be installed on a storage medium of server 200. Media gap summarizer 250 may be configured to retrieve a second metadata set relating to the requested media from media metadata database 240. Media gap summarizer 250 may then generate the information relating to the identified knowledge gaps of user 280 based on the gap analysis report and the second metadata set. In some embodiments, media gap summarizer 250 may generate gap summaries, as described with respect to the method of FIG. 4.

In some embodiments, server 200 may be further configured to provide the request for the media to a media usage monitor 260 in order to update the knowledge of user 280 in the context of the request for the media. Media usage monitor 260 may be embodied as a software module and may be installed on a remote computer, which may be coupled with server 200.

In some embodiments, server 200 may further include media usage monitor 260. Media usage monitor 260 may be installed on a storage medium of server 200. Media usage monitor 260 may be configured to retrieve a metadata set relating to the requested media from a media metadata database 270. Media usage monitor 260 may be configured to update the media usage profile of user 280 with an identifier of the media and the metadata set in media usage profiles database 230. Media metadata database 270 may be stored in a remote computer which may be coupled with server 200.

In some embodiments, media metadata databases 240 and 170 may be integrated in a single media metadata databases. The architecture shown if FIG. 5 is an exemplary architecture and any other architecture, as known in the art, may be used, including integrating all or some of the software modules in various combinations.

The term "coupled with" as indicated herein above with respect to connecting one or more remote computers with server 200 may refer to wired or wireless connections, such as internet connection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method comprising using at least one hardware processor for:
   receiving a request of a user for media;
   retrieving a first metadata set relating to said media;
   comparing between (a) a media usage profile of the user, which profile reflects knowledge of the user, and (b) the first metadata set relating to said media, to identify gaps in the knowledge of the user with respect to said media; and
   providing to the user information relating to said identified gaps.

2. The method of claim 1, wherein said providing to the user the information relating to the identified gaps comprises:
   (a) generating a gap analysis report comprising a set of facts each representing a gap of said identified gaps,
   (b) generating gap summaries for said set of facts based on said gap analysis report and said first metadata set, wherein each of said gap summaries is generated for each fact of said set of facts.

3. The method of claim 2, wherein said providing to the user the information relating to the identified gaps further comprises retrieving a second metadata ser relating to said identified gaps and wherein said generating of gap summaries is based on said second metadata set.

4. The method of claim 1, further comprising using said at least one hardware processor for generating said media usage profile of the user.

5. The method of claim 1, further comprising using said at least one hardware processor for updating the media usage profile of the user with an identifier of said media and a metadata set relating to said request for media.

6. The method of claim 1, wherein said providing to the user of information relating to the identified gaps comprises providing to the user said media integrated with said information.

7. The method of claim 1, further comprising using said at least one hardware processor for providing to said user said media.

8. The method of claim 1, wherein said media is selected from the group consisting of: a video, an image, audio, a text or a combination thereof.

9. A system comprising:
at least one server, the at least one server comprising at least one hardware processor configured to:
i) receive a request for media from a user;
ii) provide said request for media to a knowledge gap predictor, to receive information relating to gaps identified in knowledge of said user with respect to said media;
iii) retrieve said media from a media database; and
iv) provide to said user said media and said information.

10. The system of claim 9, wherein said at least one server further comprises said knowledge gap predictor, and wherein said knowledge gap predictor is configured to:
retrieve a media usage profile of said user from a media usage profile database, said media usage profile reflecting said knowledge of said user;
retrieve a first metadata set relating to said media from a media metadata database; and
compare between said media usage profile of said user and said first metadata set relating to said media, to identify said gaps in knowledge of said user with respect to said media.

11. The system of claim 10, wherein said knowledge gap predictor is further configured to:
generate a gap analysis report comprising a set of facts, wherein each fact of said set of facts represents a gap of said gaps identified in said knowledge of said user, and
provide to a media gap summarizer said gap analysis report, to receive said information.

12. The system of claim 11, wherein said at least one server further comprises said media gap summarizer, and wherein said media gap summarizer is configured to generate said information based on said gap analysis report and said first metadata set.

13. The system of claim 11, wherein said generating of said information comprises generating gap summaries, wherein a gap summary of said gap summaries is generated for each fact of said set of facts.

14. The system of claim 9, wherein said at least one hardware processor is further configured to provide said request for media to a media usage monitor, to update said knowledge of said user in the context of said request for media.

15. The system of claim 14, wherein said at least one server further comprises said media usage monitor, wherein said media usage monitor is configured to:
retrieve a metadata set relating to said media from a media metadata database, and
update a media usage profile of said user with an identifier of said media and said metadata set in a media usage profiles database, wherein said media usage profile reflects said knowledge of said user.

16. A computer program product comprising a non-transitory computer-readable storage medium having program code embodied therewith, the program code executable by at least one hardware processor to:
receive a request of a user for media;
retrieve a first metadata set relating to said media;
compare between (a) a media usage profile of the user, which profile reflects knowledge of the user, and (b) the first metadata set relating to said media, to identify gaps in the knowledge of the user with respect to said media; and
provide to the user information relating to said identified gaps.

17. The computer program product of claim 16, wherein said providing to the user the information relating to the identified gaps comprises:
(a) generating a gap analysis report comprising a set of facts, wherein each fact of said set of facts represents a gap of said identified gaps, and
(b) generating gap summaries for said set of facts based on said gap analysis report and said first metadata set, wherein a gap summary of said gap summaries is generated for each fact of said set of facts.

18. The computer program product of claim 16, wherein said program code is further executable by said at least one hardware processor to generate said media usage profile of the user.

19. The computer program product of claim 16, wherein said program code is further executable by said at least one hardware processor to update the media usage profile of the user with an identifier of said media and a metadata set relating to said request for media.

20. The computer program product of claim 16, wherein said program code is further executable by said at least one hardware processor to provide to said user said media.

* * * * *